(12) United States Patent
Goodson et al.

(10) Patent No.: US 9,471,338 B2
(45) Date of Patent: Oct. 18, 2016

(54) HYBRID DISCOVERY LIBRARY ADAPTER BOOK PROCESSING

(75) Inventors: Eric E. Goodson, Durham, TX (US); William Paul Hampel, Durham, NC (US); Santiago D. Ortega, Raleigh, NC (US); Lorin Evan Ullmann, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1128 days.

(21) Appl. No.: 13/296,887

(22) Filed: Nov. 15, 2011

(65) Prior Publication Data
US 2013/0124455 A1 May 16, 2013

(51) Int. Cl.
*G06F 7/00* (2006.01)
*G06F 17/30* (2006.01)
*G06F 9/445* (2006.01)

(52) U.S. Cl.
CPC .................. *G06F 9/44505* (2013.01)

(58) Field of Classification Search
CPC ...... G06F 7/00; G06F 17/00; G06F 9/44505; G06F 17/30; G06F 17/30374; G06F 11/3672; G06F 11/366; G06F 11/0709; G06F 11/34; G06F 11/3664; G06F 8/70; G06F 11/079
See application file for complete search history.

(56) References Cited

U.S. PATENT DOCUMENTS

2006/0136585 A1* 6/2006 Mayfield et al. ............. 709/224
2008/0215713 A1 9/2008 Cannon et al.
2009/0157728 A1 6/2009 Fletcher et al.

OTHER PUBLICATIONS

"Checksum" Wikipedia.org as taken from Wikipedia history (Oct. 25, 2010).*
http://www.redbooks.ibm.com/redbooks/pdfs/sg247264.pdf , Developing IBM Tivoli CCMDB Configuration Discovery and Tracking v1.1, Jun. 2006.
http://publib.boulder.ibm.com/infocenter/tivihelp/v3r1/topic/com. ibm.itcamsoa.doc/kd4dlmst.pdf, Discovery Library Adapters, 2009.

* cited by examiner

*Primary Examiner* — Azam Cheema
(74) *Attorney, Agent, or Firm* — Garg Law Firm, PLLC; Rakesh Garg; Joseph Petrokaitis

(57) ABSTRACT

A method for hybrid Discovery Library Adapter (DLA) book processing identifies a first logical group in a first DLA book, the first DLA book including a first set of objects constructed according to a Common Data Model (CDM) specification to represent a first set of corresponding instances of resources at a first time, the first logical group being a grouping of related subset of the first set of objects. A first value corresponding to the first logical group, and usable for ascertaining a difference between the first logical group and a second logical group in a second DLA book, is computed. A second value corresponding to the second logical group is computed and matched with the first value. If matched, a change in the first logical group as compared to the second logical group is identified and output to a DLA delta book.

17 Claims, 6 Drawing Sheets

HYBRID DISCOVERY LIBRARY ADAPTER BOOK PROCESSING

TECHNICAL FIELD

The present invention relates generally to a computer implemented method, system, and computer program product for managing information about a data processing environment's resources. Particularly, the present invention relates to a computer implemented method, system, and computer program product for hybrid processing of a Discovery Library Adapter (DLA) book based on Common Data Model (CDM).

BACKGROUND

Description of the Related Art

Data processing environments often include a variety of resources. Some examples of such resources (resources) are data processing system hardware, subsystems and components of the data processing system hardware, software executing on data processing systems, components, modules, products corresponding to such software, firmware, networking devices, power distribution components, heating and cooling components, redundant or spare parts inventory, and many other similar components.

Furthermore, some resources in the data processing environment are logical resources. For example, a virtual machine executing on a host computing system is a resource in a data processing environment. Similarly, a collection of certain other resources can also be a resource in a data processing environment. Resources in a data processing environment can also includes or relate to services provided by software components, business functions using those services, and organizations providing those business functions.

CDM is a standardized way of defining resources and their interrelationships in a hierarchy. For example, some resources defined and related to one another according to CDM may represent another resource—a higher level resource, such as a data processing system or a platform, in the data processing environment.

CDM provides classes, attributes, and relationships to describe resources and their relationships in a data processing environment. Thus, CDM acts as the dictionary and provides grammar for consistently describing and identifying resources in a data processing environment CDM is a canonical and conceptual data model that brings together various industry data models for resource representation. A DLA book is a compilation of resource information described and organized according to CDM. A data processing environment can include more than one DLA book describing the resources in the data processing environment. Typically, a DLA book is organizes according to Identity Markup Language (IDML) specification in Extensible Markup Language (XML). IDML uses XML to describe Configuration Items (CIs) (i.e., instances of resources available in a data processing environment) and their relationships with one another according to a given CDM.

SUMMARY

The illustrative embodiments provide a method, system, and computer program product for hybrid processing of a Discovery Library Adapter (DLA) book in a data processing environment. An embodiment identifies at an application executing using a processor and a memory, in a first DLA book a first logical group, the first DLA book including a first set of objects constructed according to a Common Data Model (CDM) specification to represent a first set of corresponding instances of resources in the data processing environment at a first time, the first logical group being a grouping of related subset of the first set of objects; computing at the application executing using the processor and the memory, a first value corresponding to the first logical group, the first value being usable for ascertaining a difference between the first logical group in the first DLA book and a second logical group in a second DLA book, the second DLA book including a second set of objects constructed according to the CDM specification to represent a second set of corresponding instances of the resources in the data processing environment at a second time. The embodiment computes at the application executing using the processor and the memory, a second value corresponding to the second logical group, the second value being usable for ascertaining a difference between the first logical group and the second logical group. The embodiment determines whether the first value matches the second value. The embodiment identifies, responsive to the determining being affirmative, a change in the first logical group as compared to the second logical group. The embodiment outputs the change to a DLA delta book. The embodiment transmits the DLA delta book for loading into a DLA book repository.

BRIEF DESCRIPTION OF THE SEVERAL VIEWS OF THE DRAWINGS

The novel features believed characteristic of the embodiments are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
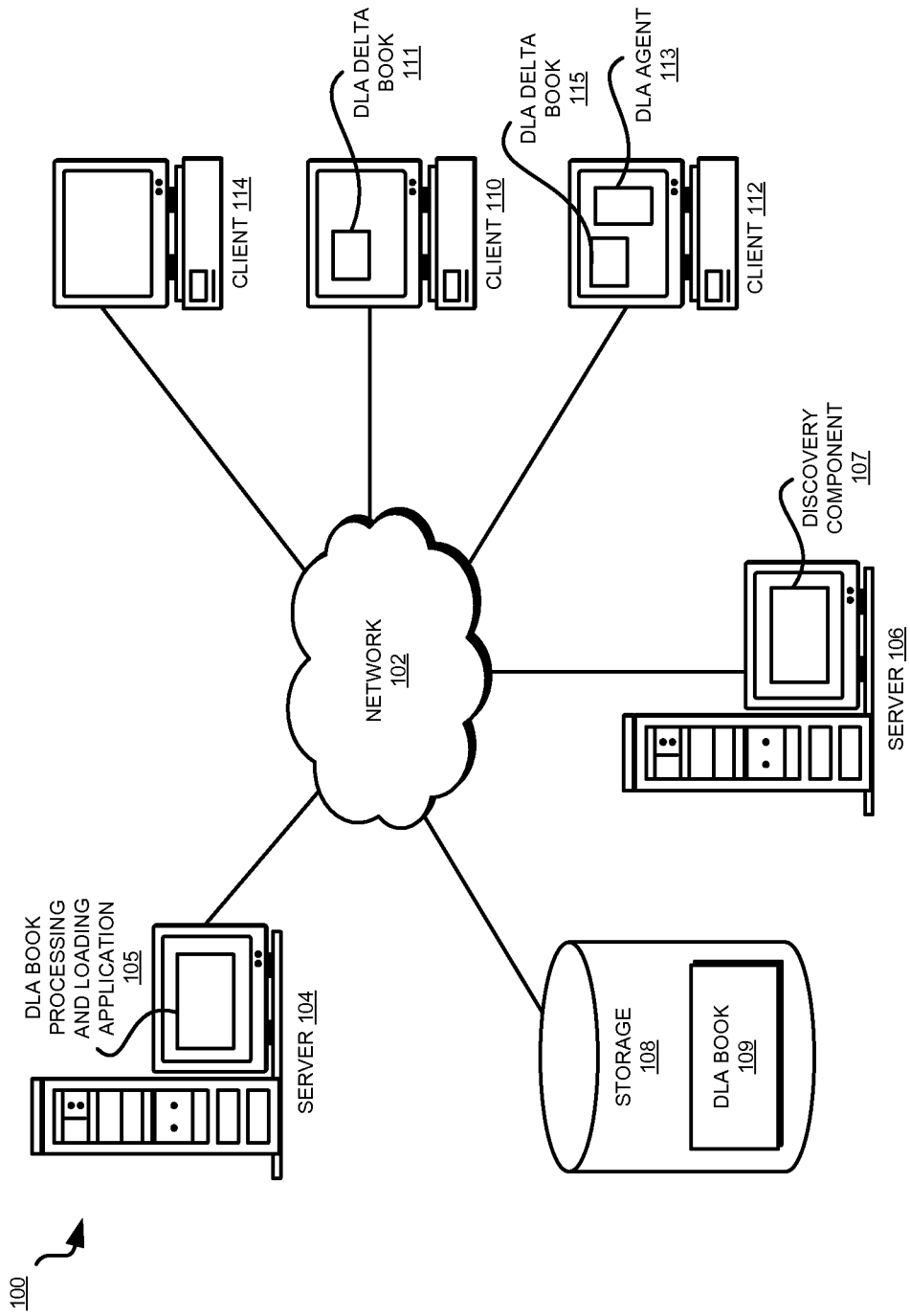
FIG. 1 depicts a pictorial representation of a network of data processing systems in which illustrative embodiments may be implemented.

When a resource is available in a data processing environment, the resource is deemed to have been instantiated. An instantiated resource must appear in at least one DLA book as an object of one or more class according to CDM. A resource object (object) can appear in more than one DLA book if either the same instance of the resource is identified in more than one DLA book, or separate instances of the same resource appear in different DLA books.

Within the scope of this disclosure, when the disclosure makes a reference to a resource appearing in a DLA book, the DLA book includes information about an instance of the resource. Within the scope of this disclosure, when the disclosure makes a reference to a resource in a data processing environment, the reference can be to the resource or to an instance thereof depending upon the implementation.

Regardless of how many DLA books a resource appears in, and regardless of how resources are identified within a DLA book, the resource has to be uniquely identifiable in the data processing environment. In other words, a resource can appear in two DLA books, having an identifier (instance identifier) that is different in each of the two DLA books but pointing back to the same resource in the data processing environment. This is not to say that the same resource cannot be identified using similar instance identifiers in multiple DLA books under certain circumstances.

A resource in a data processing environment is identified with an identifier (name, or resource identifier) that is constructed according to a set of naming rules. A naming rule is a specification or logic for constructing a resource identifier in a given data processing environment.

While a resource has to be uniquely described and identifiable in a DLA book, the same resource can appear in more than one DLA book, when several DLA books are used in a data processing environment. Additionally, a resource may be present in a data processing environment, but may not be available for use.

Furthermore, resources availability in a data processing environment can change from time to time. Instances of the resources available in the data processing environment can also change from time to time. Therefore, from time to time, configuration discovery is performed on the targets in a data processing environment and the DLA books are updated to reflect a snapshot view of the resource instances available in the data processing environment at a given time.

The illustrative embodiments recognize that the number of resources in a data processing environment can be staggering. Depending upon the size of the data processing environment and the granularity at which a typical DLA book identifies and describes the resources, a database can take on the order of a few days to load such a set of DLA books.

The illustrative embodiments recognize that a problem with the process of keeping DLA books updated is two folds—first, each DLA book file has to be compiled from large volumes of data generated during configuration discovery. Configuration discovery is a process by which an application or an agent (e.g. an adapter) systematically surveys a given data processing environment or a part thereof, to collect information about the resources available therein.

To give a sense of the complexity and enormity of the problem, a data processing environment can have several hundred host machines, and on any one host machine, tens of thousands of virtual machines (VMs), such as logical partitions (LPARs), can be configured at any given time. Furthermore, each VM can include hundreds if not thousands of resources in exclusive or shared modes. Thus, a typical data processing environment where DLA books are to be created can include millions of resources whose information has to be collected and updated in a DLA books repository, such as a relational database.

A host machine and a VM are two example of target configurations (targets) on which configuration data is collected to produce one or more DLA books. A DLA book can include information at any granularity, such as for a host machine, a VM, a subsystem of a computer, another type of system or component, or a combination thereof. The illustrative embodiments recognize that compiling the DLA book files for a given scope of resources in an efficient manner is a non-trivial task. The illustrative embodiments further recognize that managing the size of the DLA books being generated for the targets for efficiently updating the DLA books that are already loaded in the DLA books repository Second, the DLA book files, once compiled have to be loaded into the DLA books repository, to update the contents of the repository. The illustrative embodiments recognize that loading such voluminous DLA book files and performing DLA book update with them is a time consuming, computationally expensive, and often not as timely or responsive as is desirable for decision making with the information in the DLA books.

The illustrative embodiments used to describe the invention generally address and solve the above-described problems and other problems related to DLA books processing in a data processing environment. The illustrative embodiments provide a method, system, and computer program product for a hybrid Discovery Library Adapter book processing in a data processing environment.

Generally, the illustrative embodiments describe various ways of using the data from a configuration discovery, relative to a previously known configuration, in order to reduce a resulting DLA book. An embodiment reduces the volume of data in the DLA books by identifying the changes in the corresponding configuration in a novel and efficient manner.

An embodiment reduces a DLA book to reflect only the changes in the configuration as compared to a previous version of the DLA book. The embodiment identifies the changes using a hierarchical comparison of objects resulting from the configuration discovery. The hierarchy begins at the file-level, where, for a DLA book, all objects corresponding to all discovered instances of the resources are considered as a whole to determine a file-level change.

The hierarchy further includes logical grouping of objects, where a set of objects are related to one another in a "logical group" owing to a relationship between those objects. As some examples, within the scope of the illustrative embodiments, the logical group can be inferred from the IDML relationships between objects, detected by the order of discovery during configuration discovery, or specified in other manner, such as by a user.

An embodiment identifies changes in a novel and efficient manner at the logical group level. An embodiment can also identify changes at an object level, such as when an object is not a part of a logical group. For example, an embodiment can regard an object that is not a part of a logical group as a logical group of a single object.

An embodiment outputs the changes identified at the file-level, logical group level, or object level, to a DLA delta book. A DLA delta book according to an embodiment is a collection of differences between two DLA books, e.g., a previous version of a DLA book according to a configuration of a target at a previous time, and a later version of the DLA book according to the configuration of the target at a later time.

Furthermore, an embodiment detects these changes at the file-level, logical group level, or object level, in line with the configuration discovery. For example, when the configuration discovery data of a target is in the target's memory, an embodiment performs the computations described herein with that data in memory and produces the DLA delta book.

The illustrative embodiments recognize that compared to the number of resources available in a data processing environment at any given time, a relatively small number of resources change from time to time to be reflected in a DLA book update. An embodiment leverages this recognition, and utilizes this recognition to create a DLA delta book at a target from an embodiment such that the DLA delta book file is significantly smaller as compared to the complete version of the DLA book resulting from configuration discovery at the target.

The smaller DLA delta book file is far more easily transported to a server that performs further processing of DLA books before loading the DLA books into a DLA books repository. The smaller DLA delta book file is also easier and faster to load in a DLA books repository as compared to performing a DLA book update using the a complete DLA book.

The illustrative embodiments also recognize that changes occurring in a data processing environment are important from a decision making point of view. An embodiment uses the change detection process used to create a DLA delta book to also generate a change report.

The illustrative embodiments are described with respect to certain components or resources only as examples. Such descriptions are not intended to be limiting on the illustrative embodiments. For example, an illustrative embodiment described with respect to a computing hardware resource can be implemented with respect to a data storage component, networking component, peripherals, or software resources within the scope of the illustrative embodiments.

Similarly, the illustrative embodiments are described with respect to certain identifiers, values, names, and objects only as examples. Such descriptions are not intended to be limiting on the illustrative embodiments. For example, an illustrative embodiment described with respect to a checksum can be implemented using a hash value or another value, metadata, or manner of ascertaining data within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
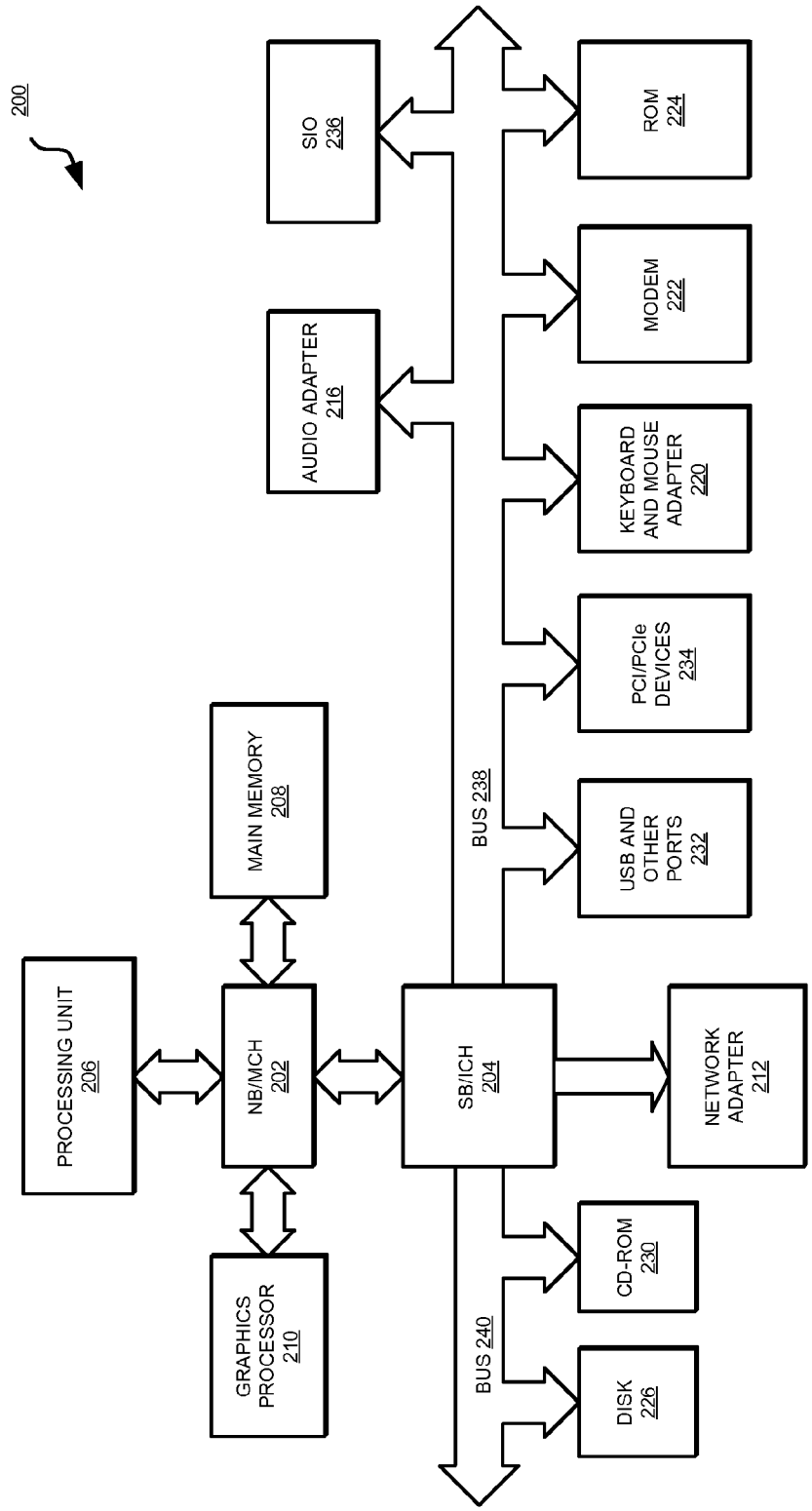
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

A data processing system, such as server 104 includes DLA book processing and loading application 105. Storage 108 includes DLA book 109, such as when a database or another suitable type of data repository uses storage 108 to store DLA book 109. Server 106 includes discovery component 107 that can remotely perform configuration discovery on certain types of targets, such as on client 110. Another target, such as client 112 may include DLA agent 113, which may be an agent application of a corresponding server application (not shown), to perform configuration discovery locally and autonomously. As an example, target client 110 produces DLA delta book 111 according to an embodiment. For example, discovery component 107 may implement an embodiment for change detection using server 106's memory to produce DLA delta book 111. As another example, target client 112 produces DLA delta book 115 according to an embodiment. For example, DLA agent 113 may implement an embodiment for change detection using target client 112's memory to produce DLA delta book 115. Application 105 processes DLA delta books 111 and 115 based on which DLA book 109 may be updated in storage 108.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
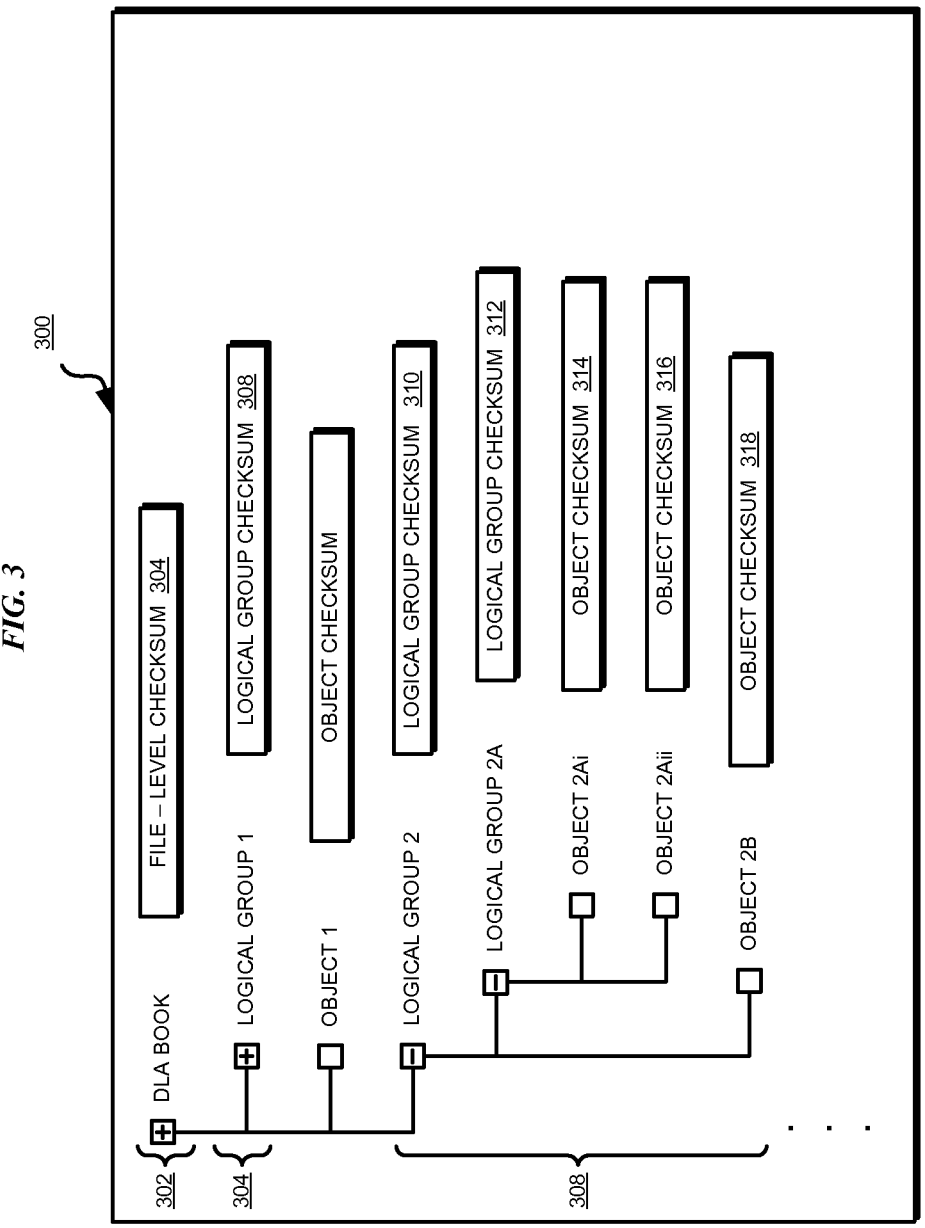
FIG. 3 depicts a block diagram of an organization of a DLA book usable for hybrid DLA book processing in accordance with an illustrative embodiment.

With reference to FIG. 3, this figure depicts a block diagram of an organization of a DLA book usable for hybrid DLA book processing in accordance with an illustrative embodiment. Data 300 is a data structure created using data from a current configuration discovery at a target in memory. For example, in one embodiment, discovery component 107 may create data 300 for configuration discovery at target client 110 in server 106's memory in FIG. 1. In another embodiment, DLA agent 113 may create data 300 for configuration discovery at target client 112 in client 112's memory in FIG. 1.

An embodiment reduces data 300 to form DLA delta book 111 or 115 in FIG. 1. The reduction process is described using checksum values as a method of ascertaining differences between comparable data only as an example. Checksums are not intended to be limiting on the illustrative embodiments. Those of ordinary skill in the art will be able to recognize many other methods of ascertaining differences between comparable data, and such methods are contemplated within the scope of the illustrative embodiments.

In accordance with an embodiment, in-line with the current discovery process at a target, data 300 is stored in a memory in a hierarchical manner. Another set of data corresponding to a previous DLA book based on a previous configuration discovery at the same target is also available in memory (not shown).

As in the example of FIG. 3, data 300 starts at file-level 302, which encompasses all the objects crated from the current configuration discovery, as would be represented in a complete DLA book. An embodiment recognizes logical groups of objects that may be present in data 300. For example, logical grouping of certain objects may be apparent from the IDML relationship between those objects, naming rules followed by those objects to refer to certain related resources, user-specification of logical groups, and any other suitable indicator for grouping objects in a logical group. Logical groups 306 and 308 are two example logical groups thus identified in data 300's hierarchy below file-level 302. As depicted by the example in FIG. 3, a logical group can include other logical groups, objects, or a combination thereof, in a nested manner.

Processing of data 300 to produce a DLA delta book in the manner described herein is called hybrid DLA book processing. The processing is hybrid because (i) the process compares multiple levels within data 300 to perform the reduction, such as file-level and logical group level comparisons, and (ii) because the process operates in conjunction with other DLA delta book creation mechanisms on the server side, such as in conjunction with a process in application 107 in FIG. 1.

While creating the hierarchy including the logical groups, an embodiment computes checksums for each level at which object data can be compared. For example, data 300 as a whole can be compared at file-level 302 to a previous version of similar data in a previous version of the DLA book. If a target for which the DLA book is being updated has experienced no change in the configuration between the time of the previous version of the DLA book and the current configuration discovery, file-level checksum 304 of data 300 should match a similar checksum computed for the previous version of the DLA book.

If file-level checksum 304 matches the file-level checksum of the previous DLA book, entire data 300 can be removed from consideration in the update of the DLA book. In such a case, the reduction avoids transmitting voluminous data 300 over a network, processing of the data 300 for DLA book update, and expenditure of computing resources for applying the update to the previous version of the DLA book in a repository.

An embodiment recognizes that even a single bit change in data 300 can cause file-level checksum 304 to not match a corresponding checksum from the previous version of the DLA book. Therefore, when file-level checksum 304 fails to match a corresponding checksum from the previous version of the DLA book, an embodiment proceeds to generate checksums for progressively lower ranks of the hierarchy in data 300, and compare those checksums with checksums of comparable ranks in the previous version of the DLA book. Furthermore, the lower ranks of data 300's hierarchy, such as logical groups 306 and 308, are identified based on the contents of data 300 (e.g., relationships identified in the objects themselves) and without the benefit of a predefined schema, such as an XML schema.

For example, an embodiment creates checksum 308 for logical group 306 as a whole and compares checksum 308 with a checksum computed for a similar logical group of objects in the previous version of the DLA book. If checksum matches the checksum computed for a similar logical group of objects in the previous version of the DLA book, logical group 306 can be removed from data 300 to reduce the size of the resulting DLA delta book.

An embodiment can compute checksums for any granularity within data 300 as needed in a particular implementation. For example, checksum 310 corresponds to logical group 308 as a whole, while checksum 312 is a checksum for a part of logical group 308, the part itself being a nested logical group labeled "logical group 2A". logical group 2A includes objects "object 2Ai" and "object 2Aii", for which the embodiment computes checksums 314 and 316 respectively. Logical group 308 also includes "object 2B" for which the embodiment computes checksum 318.

A hybrid method of processing data 300 to produce a reduced DLA delta book compares checksums at various levels in the hierarchy of data 300, including but not limited to checksums 304, 308, 310, 312, 314, 316, and 318. Through such comparison the embodiment eliminates that object, logical group, or entire file of data 300, whose checksum matches the checksum of a comparable object, logical group, or the entire file of the previous version of the DLA book.

Where the checksum of an object or a logical group in data 300 does not match a checksum of a corresponding object or logical group in the previous version of the DLA book, the embodiment outputs the changes to a DLA delta book. Through this reduction or compaction by eliminating unchanged portions of data 300, an embodiment generates a DLA delta book that, in most cases, is smaller than the size of data 300.

An embodiment then transmits the DLA delta book to a server, such as via File Transfer Protocol (FTP), for further server-side processing and loading into a DLA book repository. Of course, occasionally all of data 300 is needed, such as for reconstructing a damaged DLA book repository, after a significant change at the target, an upgrade of the repository or server, or a combination thereof. When all of data 300 is needed, the reduction described herein can be bypassed at the target. For example, DLA agent 113 or discovery component 107 in FIG. 1 can be configured to perform the reduction of data 300 or bypass such reduction in response to an instruction.

Figure 4:
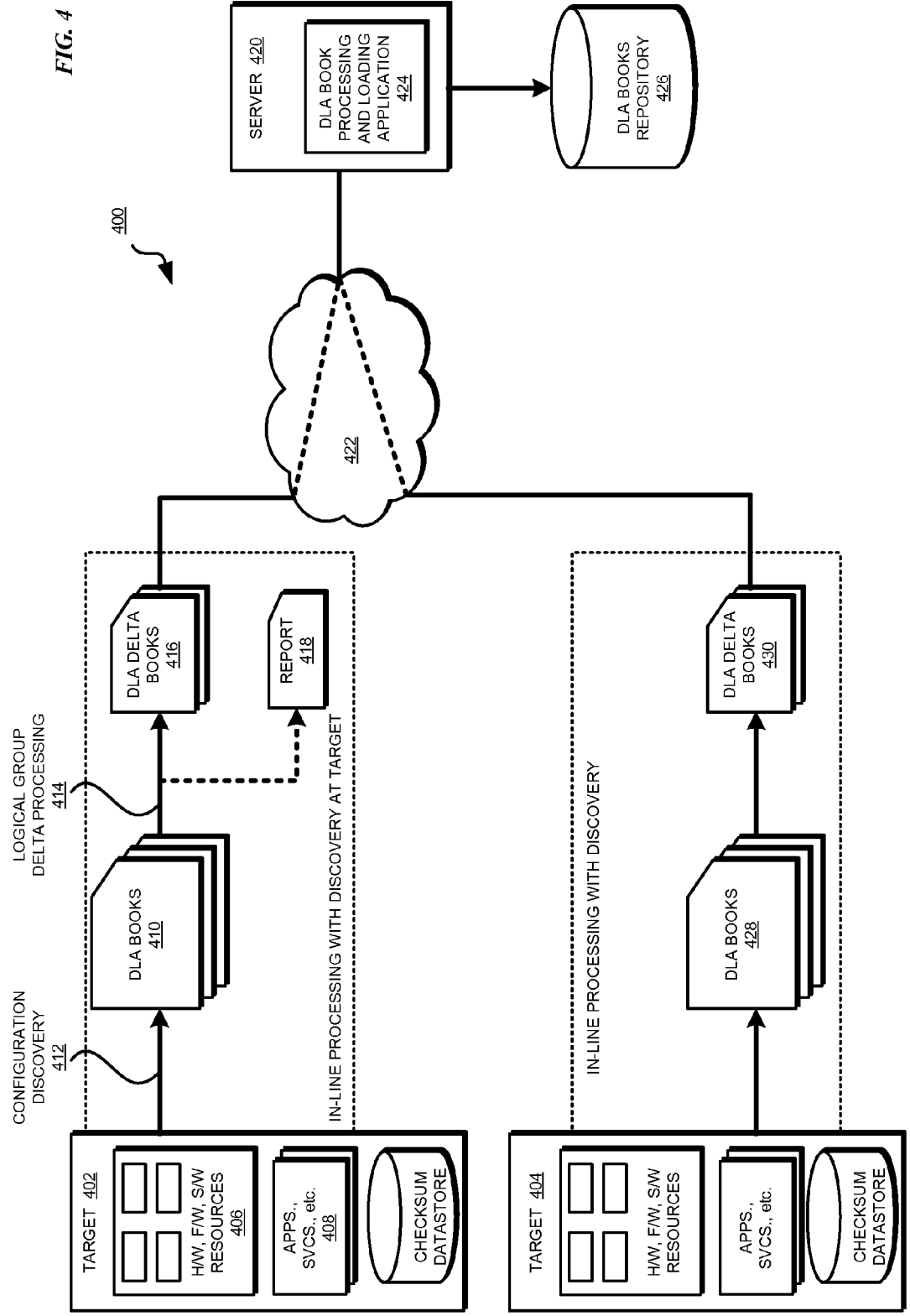
FIG. 4 depicts a block diagram of a logical group delta processing of a DLA book in accordance with an illustrative embodiment.

With reference to FIG. 4, this figure depicts a block diagram of a logical group delta processing of a DLA book in accordance with an illustrative embodiment. Logical group delta processing a part of hybrid DLA book processing as described earlier. Targets 402 and 404 may be implemented using clients 110, 112, or a combination thereof, in FIG. 1.

Target 402 is used as an example configuration to illustrate the operation of an embodiment. Target 402 includes resource 406, which may be hardware, software, or firmware resources. Target 402 further includes resources 408, which may be applications, application components, services, functions offered from target 402. As an example, one of resources 408 may be a DLA agent application, which creates one or more DLA book 410 using configuration discovery 412. At least one of DLA books 410 includes data and a hierarchy of objects and logical groups in a manner similar to data 300 in FIG. 3.

In one embodiment, one DLA book in DLA books 410 may be a previous version of another DLA book 410 that includes the current results of configuration discovery 412. In another embodiment, target 402 may produce more than one DLA books 410 as a result of current configuration discovery 412.

Logical group delta processing 414 is the process of reducing DLA book 410 by computing checksums at various levels in the hierarchy of DLA book 410 and comparing those checksums with computed checksums of corresponding levels of objects and logical groups in a previous version of the DLA book. The computed checksums are preferably stored locally at the target. For example, the checksums computed during logical group delta processing 414 are stored at checksum datastore 415 in target 402.

Logical group delta processing 414 removes those logical groups (or objects, or an entire DLA book 410 file, as the case may be), upon finding a match between the checksums. The removal of one or more logical group corresponding to a matching checksum from a current DLA book 410 results in DLA delta book 416. When more than one current DLA books 410 are reduced through logical group delta processing in this manner, more than one DLA delta books 416 may result.

Thus, DLA delta book 416 includes data corresponding to the changes in the configuration at target 402. In most cases, DLA delta book 416 is significantly smaller than a corresponding DLA book 410. Having identified the changes in the configuration of target 402 in this manner, an embodiment can also produce report 418. Report 418 can be produced at target 402 in any manner suitable to a particular implementation.

DLA delta book 416 is communicated to server 420 over network 422, such as via FTP. Server 420 includes DLA book processing and loading application 424. Application 424 performs additional processing of DLA delta book 416, such as XML parsing of DLA delta book 416, further reduction of DLA delta book 416 in other manners, or a combination thereof. Application 424 loads DLA delta book 416 after such processing into DLA books repository 426. For example, application 424 can apply DLA delta book 416 to a DLA book already loaded in repository 426 as an update.

In one embodiment, another server (not shown) may remotely perform configuration discovery and the in-line processing on target 404. In such a case, DLA books 428 may be stored using a memory at such server, and a similar logical group delta processing operation may execute at the server to produce DLA delta books 430 in the server's memory. DLA delta books 430 may then be made available to application 424 in any suitable manner, such as through shared memory, a communication bus, a file-system, or another data network.

The configuration discovery process, the DLA delta books creation process, and other operations of the various embodiments are generally applicable to any type of resources available in a data processing environment. Furthermore, the configuration data that is collected, the configuration data that is organized in a DLA book, the configuration data that is compared to form DLA delta books according to various embodiments are usable with data in any format, such as binary data, hexadecimal data, textual data, human readable data, images, or a combination thereof. Additionally, the data may be compressed, encrypted, or transformed in other manner before being presented to an embodiment, after the processing by an embodiment, or a combination thereof.

Figure 5:
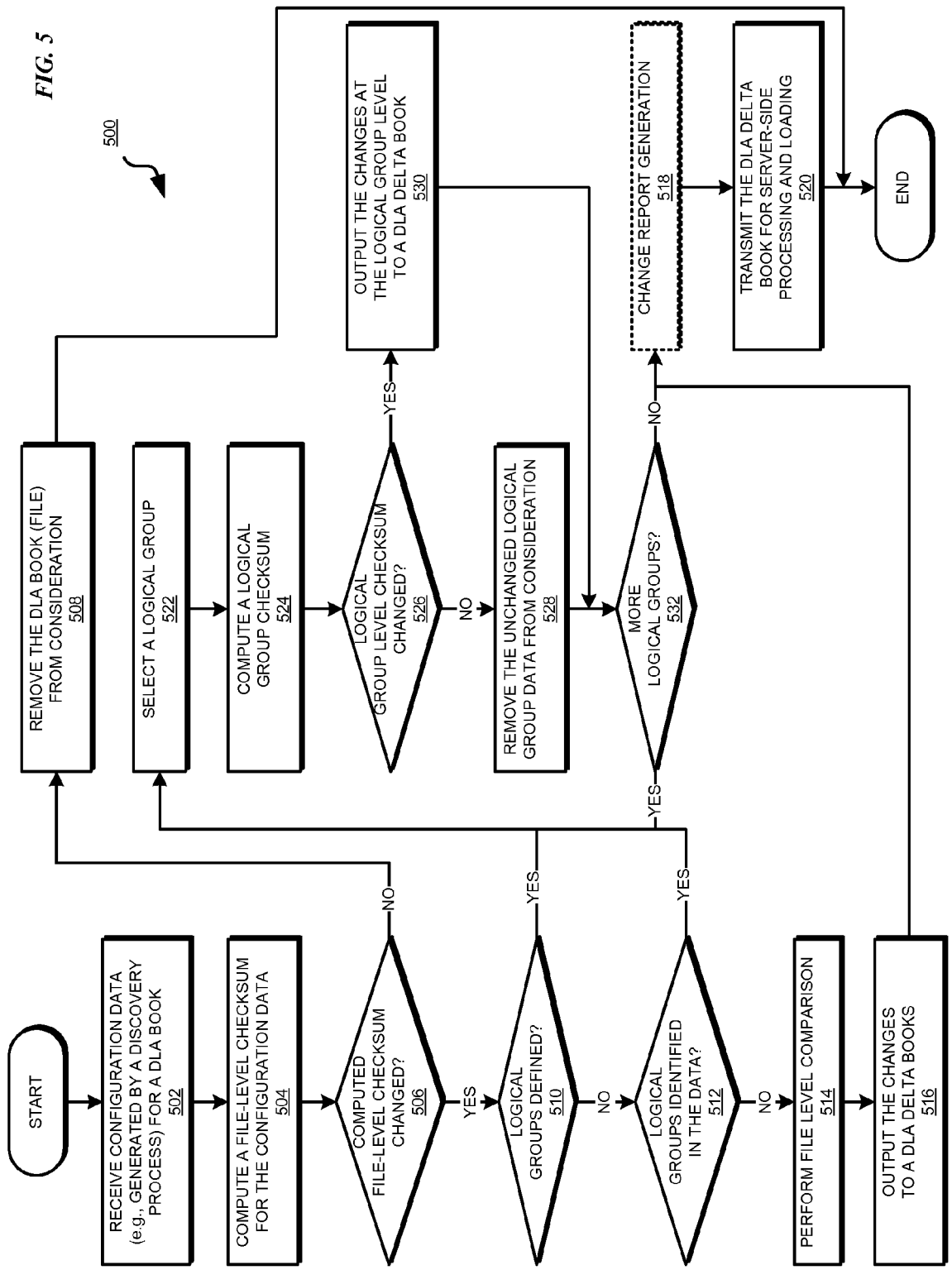
FIG. 5 depicts a flowchart of an example process of hybrid DLA book processing in accordance with an illustrative embodiment.

With reference to FIG. 5, this figure depicts a flowchart of an example process of hybrid DLA book processing in accordance with an illustrative embodiment. Process 500 can be implemented in a DLA agent application, such as DLA agent application 113 in FIG. 1, or in a remote discovery application, such as discovery component 107 in FIG. 1.

Process 500 begins by receiving configuration data for a DLA book (step 502). Process 500 computes a file-level checksum (or other suitable information for ascertaining differences in comparable data) for the configuration data (step 504). Process 500 determines whether the computed file-level checksum has changed for configuration data of step 502 as compared to a previous version of the DLA book (step 506).

If the computed file-level checksum is unchanged ("No" path of step 506), process 500 removes the DLA book file including the configuration data of step 502 from consideration for DLA book repository update (step 508). Process 500 ends thereafter.

If the computed file-level checksum has changed ("Yes" path of step 506), process 500 determines whether a set of logical groups is defined for the DLA book of step 502 (step 510). If no logical groups are defined for the DLA book ("No" path of step 510), process 500 determines whether logical groups are identifiable in the DLA book's data without a schema of the data (step 512).

If no logical groups are identifiable in the DLA book's data ("No" path of step 512), process 500 performs a file-level comparison, such as an object-by-object comparison, attribute-by-attribute comparison, relationship-by-relationship comparison, or a combination thereof (step 514). Process 500 outputs the changes in the DLA book's data to a DLA delta book (step 516).

Process 500 may optionally perform a change report generation based on the changes noted in the DLA delta book (step 518). Process 500 transmits the DLA delta book for server-side processing and loading into a DLA book repository (step 520). Process 500 ends thereafter.

Returning to steps 510 and 512, if one or more logical group is defined ("Yes" path of step 510), or one or more logical group is identified in the data ("Yes" path of step 512), process 500 selects one of such logical groups (step 522). In an embodiment, the selection of step 522 may progress according to the hierarchical order of the logical groups in the DLA book.

Process 500 computes a checksum for the selected logical group (step 524). Process 500 determines whether the computed checksum of the selected logical group has changed as compared to a checksum for a comparable logical group in a previous version of the DLA book (step 526).

If the checksum of the selected logical group has not changed ("No" path of step 526), process 500 removes the selected logical group from consideration, i.e., the selected logical group will not be included in the DLA delta book (step 528). If the checksum of the selected logical group has changed ("Yes" path of step 526), process 500 outputs the changes in the logical group to the DLA delta book (step 530).

Process 500 determines whether more logical groups in the DLA book, whether specified or identified, remain to be evaluated in a similar manner (step 532). If more logical groups remain to be evaluated ("Yes" path of step 532), process 500 returns to step 522 and selects another logical group for similar evaluation at step 526 and logical group delta processing at steps 528 and 530.

If no more logical groups remain to be evaluated and processed ("No" path of step 532), process 500 may optionally perform a change report generation based on the changes noted in the DLA delta book at step 518. Process 500 transmits the DLA delta book for server-side processing and loading into a DLA book repository at step 520. Process 500 ends thereafter.

Figure 6:
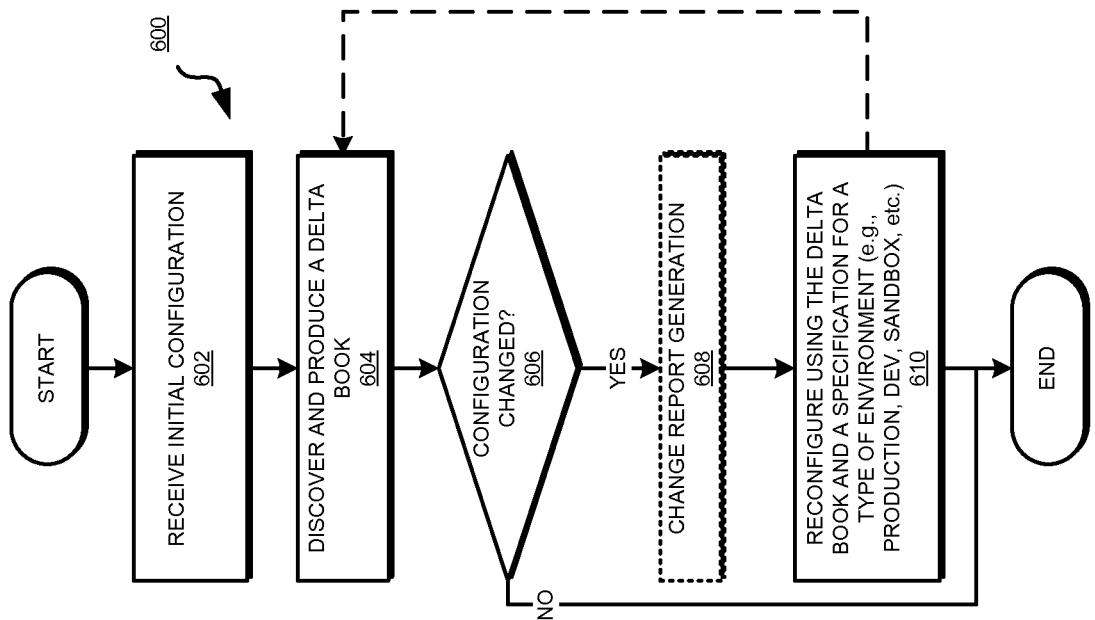
FIG. 6 depicts a flowchart of an example process of configuring a data processing environment based on a DLA delta book in accordance with an illustrative embodiment.

With reference to FIG. 6, this figure depicts a flowchart of an example process of configuring a data processing environment based on a DLA delta book in accordance with an illustrative embodiment. Process 600 may be implemented at a target, such as target 402 in FIG. 4.

Process 600 begins by receiving an initial configuration for a target, such as a previous version of a DLA book created for the target (step 602). Process 600 performs a configuration discovery and produces a DLA delta book, such as by using process 500 in FIG. 5 (step 604).

Process 600 determines whether the configuration of the particular target has changed (step 606). If the configuration has changed ("Yes" path of step 606), process 600 may optionally generate a change report in the manner of step 518 in FIG. 5 (step 608). Further, if the configuration has changed, process 600 reconfigures the target data processing system using the information about the changes from the DLA delta book, specification for that target data processing system, or a combination thereof (step 610). For example, the target data processing system may be development environment, which should be reconfigured to a particular specification. Process 600 may reconfigure the target in step 610 using such specification in combination with the changes identified in the DLA delta book. Generally, if the initial configuration of a data processing system was A, the configuration was changed to B according to the DLA delta book, and the data processing system should be reconfigured to a configuration C, process 600 can reconfigure the data processing system to configuration C by performing changes corresponding to C minus B specification.

Process 600 may repeat steps 604-610 any number of times. For example, such configuration change and reconfiguration of a data processing system may be a routine exercise in certain environments such as development or testing setups. Alternatively, process 600 may end after step 610. If the configuration has not changed ("No" path of step 606), process 600 may end thereafter as well.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for hybrid DLA book processing in a data processing environment. Using an embodiment of the invention, the configuration change data in a given data processing environment can be compiled in a DLA book in less time and with less computational effort as compared to the presently used DLA book generation methods. While certain embodiments are described using checksums, such descriptions are not intended to be limiting on the illustrative embodiments. Any other suitable method for ascertaining similarities or differences between comparable data can be used in conjunction with an embodiment within the scope of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages, and mainframe programming languages such as REXX, Assembly, and Cobol. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for hybrid Discovery Library Adapter (DLA) book processing in a data processing environment, the method comprising:
    constructing, in a first DLA book, a first set of objects according to a Common Data Model (CDM) specification to represent a first set of corresponding instances of resources in the data processing environment at a first time;
    computing, using a processor, a first value by applying an algorithm on a first data, the first data describing a first subset of the first set of objects, wherein the first subset includes objects related according to a relationship condition;
    constructing, according to the CDM specification, in a second DLA book, a second set of objects to represent a second set of corresponding instances of resources in the data processing environment at a second time;
    computing, using the processor, a second value by applying the algorithm on a second data, the second data describing a second subset of the second set of objects, wherein the second subset includes objects related according to the relationship condition;
    identifying, responsive to the first value being different from the second value, a change in the instances of resources in the data processing environment at the second time;
    computing a first file-level value for the first DLA book and a second file-level value of the second DLA book, the first and second file-level values being usable for ascertaining a difference between the first DLA book and the second DLA book;
    determining whether the first file-level value matches the second file-level value, wherein the constructing the first set of objects, the computing the first value, the constructing the second set of objects, the computing the second value, the identifying the change, and outputting the change occur responsive to the first file-level value not matching the second file-level value;
    outputting the change to a DLA delta book; and
    transmitting, instead of the second DLA book, the DLA delta book for loading into a DLA book repository.

2. The method of claim 1, wherein a first logical group of objects in the first DLA book is specified in a file, and wherein the first logical group of objects comprises those objects in the first DLA book that are related to one another according to a relationship condition.

3. The method of claim 2, wherein the first logical group is identified without using a predefined schema for the first DLA book.

4. The method of claim 1, wherein the first and the second DLA books are constructed according to Identity Markup Language (IDML) specification.

5. The method of claim 1, wherein an application to collect data for the first DLA book executes in a data processing system that is a target of configuration discovery for the first DLA book.

6. The method of claim 1, further comprising:
omitting, responsive to the first value being equal to the second value, the first data from the DLA delta book.

7. The method of claim 1, wherein the first and the second values are checksums.

8. The method of claim 1, wherein the relationship condition comprises:
existence of an Identity Markup Language (IDML) relationship between the objects in the logical group.

9. The method of claim 1, wherein the relationship condition comprises:
an order in which the objects in the logical group are discovered during configuration discovery.

10. The method of claim 1, wherein the relationship condition comprises:
a naming rule followed by the objects in the logical group to refer to their corresponding resources.

11. A computer usable program product comprising a computer usable storage device including computer usable code for hybrid Discovery Library Adapter (DLA) book processing in a data processing environment, the computer usable code comprising:
computer usable code for constructing, in a first DLA book, a first set of objects according to a Common Data Model (CDM) specification to represent a first set of corresponding instances of resources in the data processing environment at a first time;
computer usable code for computing, using a processor, a first value by applying an algorithm on a first data, the first data describing a first subset of the first set of objects, wherein the first subset includes objects related according to a relationship condition;
computer usable code for constructing, according to the CDM specification, in a second DLA book, a second set of objects to represent a second set of corresponding instances of resources in the data processing environment at a second time;
computer usable code for computing, using the processor, a second value by applying the algorithm on a second data, the second data describing a second subset of the second set of objects, wherein the second subset includes objects related according to the relationship condition;
computer usable code for identifying, responsive to the first value being different from the second value, a change in the instances of resources in the data processing environment at the second time;
computer usable code for computing a first file-level value for the first DLA book and a second file-level value of the second DLA book, the first and second file-level values being usable for ascertaining a difference between the first DLA book and the second DLA book;
computer usable code for determining whether the first file-level value matches the second file-level value, wherein the constructing the first set of objects, the computing the first value, the constructing the second set of objects, the computing the second value, the identifying the change, and outputting the change occur responsive to the first file-level value not matching the second file-level value;
computer usable code for outputting the change to a DLA delta book; and
computer usable code for transmitting, instead of the second DLA book, the DLA delta book for loading into a DLA book repository.

12. The computer usable program product of claim 11, wherein a first logical group of objects in the first DLA book is specified in a file, and wherein the first logical group of objects comprises those objects in the first DLA book that are related to one another according to a relationship condition.

13. The computer usable program product of claim 12, wherein the first logical group is identified without using a predefined schema for the first DLA book.

14. The computer usable program product of claim 11, wherein the first and the second DLA books are constructed according to Identity Markup Language (IDML) specification.

15. The computer usable program product of claim 11, wherein the computer usable code is stored in a computer readable storage device in a data processing system, and wherein the computer usable code is transferred over a network from a remote data processing system.

16. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

17. A data processing system for hybrid Discovery Library Adapter (DLA) book processing in a data processing environment, the data processing system comprising:
a storage device, wherein the storage device stores computer usable program code; and
a processor, wherein the processor executes the computer usable program code, and wherein the computer usable program code comprises:
computer usable code for constructing, in a first DLA book, a first set of objects according to a Common Data Model (CDM) specification to represent a first set of corresponding instances of resources in the data processing environment at a first time;
computer usable code for computing, using a processor, a first value by applying an algorithm on a first data, the first data describing a first subset of the first set of objects, wherein the first subset includes objects related according to a relationship condition;
computer usable code for constructing, according to the CDM specification, in a second DLA book, a second set of objects to represent a second set of corresponding instances of resources in the data processing environment at a second time;
computer usable code for computing, using the processor, a second value by applying the algorithm on a second data, the second data describing a second subset of the second set of objects, wherein the second subset includes objects related according to the relationship condition;
computer usable code for identifying, responsive to the first value being different from the second value, a change in the instances of resources in the data processing environment at the second time;

computer usable code for computing a first file-level value for the first DLA book and a second file-level value of the second DLA book, the first and second file-level values being usable for ascertaining a difference between the first DLA book and the second DLA book;

computer usable code for determining whether the first file-level value matches the second file-level value, wherein the constructing the first set of objects, the computing the first value, the constructing the second set of objects, the computing the second value, the identifying the change, and outputting the change occur responsive to the first file-level value not matching the second file-level value;

computer usable code for outputting the change to a DLA delta book; and computer usable code for transmitting, instead of the second DLA book, the DLA delta book for loading into a DLA book repository.

* * * * *